Nov. 10, 1964    E. NASH    3,156,305
CONTOUR HOE
Filed Oct. 21, 1960
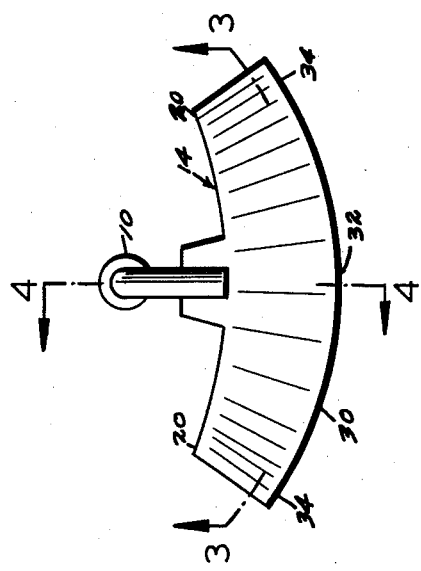
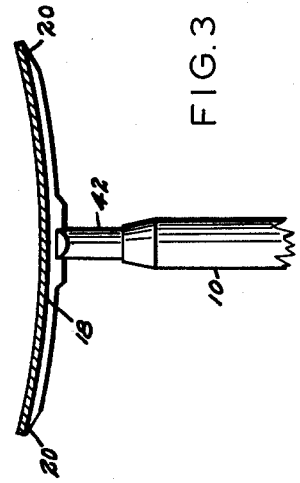
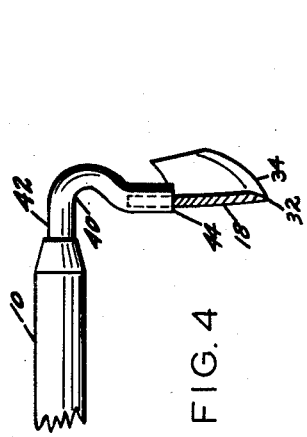
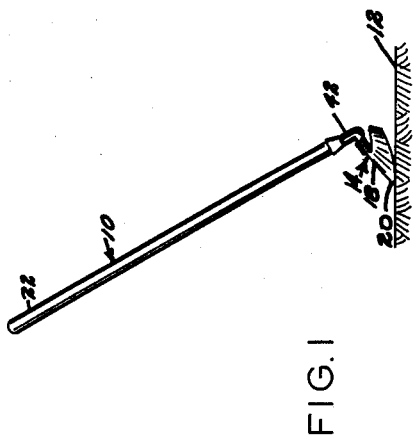
INVENTOR.
ELVIN NASH
BY

United States Patent Office 3,156,305
Patented Nov. 10, 1964

3,156,305
CONTOUR HOE
Elvin Nash, Nodaway, Iowa
Filed Oct. 21, 1960, Ser. No. 64,103
1 Claim. (Cl. 172—381)

This invention relates to hoes, and more particularly to hoes adapted to be held in the hand for cultivating.

It is a particular object of this invention to provide a hoe of novel shape with advantages over a conventional straight blade hoe.

It is the object of this invention to provide a hoe provided with a blade adapted to operate with a minimum of effort and a maximum of efficiency. More particularly my hoe blade is elongated in a direction transverse to the hoe handle and is curved along its length with its outer ends curved away from the handle so as to present a convex surface to the earth as the hoe is pulled whereby the hoe draws itself into the ground with a superior cutting action.

It is to be understood that the under edge 30 of my hoe is gradually convexly curved so as to distinguish from a plow-type hoe which digs into the ground to an excessive amount for the cultivation purposes I intended, and is distinguished from the pointed plow-type of blade which cuts into the ground at a much greater rate than is desirable for hoe-type cultivation. However, it will also be under stood that the convexly curved underedge of my hoe is sufficiently gradually convex as to cause the hoe to draw itself into the ground to a limited extent which is substantially greater and more desirable than could be the case in a hoe that has a straight horizontal cutting surface.

An object of this invention is to provide a hoe having a convex ground engaging edge or under surface which is substantially of the same curvature along its entire surface whereby the blade does not tend to furrow the ground as sharply as if it were pointed.

A still further object is to provide a hoe blade that can be manufactured by cutting the blade from the cultivator discs to gain an economy of production.

It is known that a hoe pulls into the ground more easily if the lower end of the blade is slanted back toward the handle and I use this feature in my hoe. However, I discovered a more efficient feature gained by presenting a convex surface to the ground, as this allows the hoe to dig in with less effort.

I further discovered that providing the hoe blade with an under surface that is curved rather than straight permits a smaller portion of the blade to enter the ground whereby the outer portions of the under surface of the blade gradually enter afterwards and are in a sense pulled in by the center portion of the bottom edge of the blade and because the blade is generally inclined, back towards the handle at its lower end.

From the specification, it will become apparent that the invention disclosed will adequately accomplish the functions for which it has been designed and in an economical manner and that its simplicity, accuracy, and ease of operation are such as to provide a relatively inexpensive device considering what it will accomplish and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size and arrangement of details and parts such as come within the purview of the invention claimed may be resorted to in actual practice if desired.

In the drawings:

FIGURE 1 is a side elevation of this invention shown in position of use.

FIGURE 2 is the forward view of the blade end portion of the hoe taken at a time when the blade end of the hoe is disposed approximately vertical, a portion of the handle being broken away.

FIGURE 3 is a view in-section taken along line 3—3 of FIGURE 2.

FIGURE 4 is a view in-section taken along line 4—4 of FIGURE 2 with a portion of the handle broken away.

Referring to FIGURE 1, it will be seen that in operation, an elongated handle 10 of my hoe is held at approximately 60 degrees with respect to the horizontal surface 12 of the ground. The hoe has a blade generally indicated at 14 and which has a forward earth engaging surface 18 which is disposed generally transversely to the handle 10 at approximately a right angle although preferably curving. The blade 14 has its earth engaging surface 18 curving slightly away from a right angle at the lower tip 20 of the blade as seen in FIGURE 1.

As thus described, the lower tip 20 is disposed slightly farther away from the upper end 22 of the handle than the upper parts of the earth engaging surface 18 of the blade 14.

It will be seen that a lowermost tip 20 of the blade engages the earth when the hoe is first applied to the ground. However, when the hoe is pulled into the ground, the earth engaging surface 18 often entirely engages the earth.

The hoe blade 14 is elongated in a direction transverse to the hoe handle as the hoe handle is seen from above when the handle is held in a horizontal position with the blade depending as illustrated in FIGURE 2.

The blade 14 is curved along its elongated length with its outer ends 20 curved away from that end 22 of the handle 10 which is disposed opposite from the blade end, whereby the blade presents a convex surface 18 to the earth all along its length. The under edge 30 of the hoe blade is a sharp under surface which is convex having a more downwardly disposed center portion 32 and gradually curved upward therefrom with the outer end portions 34 extending upwardly from the center portion 32, whereby the outer end portion 34 of the edge 30 of blade 14 gradually enters the ground after the center portion 32 enters.

The blade 14 is attached to the handle 10 by connection portion 40 which latter has an upper end 42 attached to the handle 10 in any conventional manner and has a lower end 44 attached in any suitable way to the blade 14.

It will be seen that the ground engaging undersurface 30 of the blade has a length which is more than four times its depth when its depth is measured from its uppermost end portion to its lowermost center portion to permit the hoe to be drawn into the ground gradually as makes ground entry easier than if the under edge were flat and more gradual than if the under edge were more sharply curved.

It will be further seen that the entirety of the curved under edge 30 is of substantially the same curvature whereby the blade does not tend to furrow the ground as sharply as if it were pointed.

I claim:

A hoe having an elongated handle and having a blade having an earth engaging surface disposed transversely to the handle and generally facing the opposite end of said handle from said blade, said hoe blade being elongated in a direction transverse to said hoe handle as seen from above when said handle is held in a horizontal position with blade depending, said blade having side portions on either side of said handle, each side portion being curved all along its length with its outer ends progressively farther from that end of the handle which is opposite from said blade whereby said blade presents a convex surface to the earth as the hoe is pulled through the ground, said hoe blade having an under edge which is gradually convexly curved with side portions extending upwardly from its center portion and the entirety of said under edge being of substantially the same curvature whereby the blade does not tend to furrow the ground as sharply as if it were pointed, the under edge of said blade having a length which is more than four times its depth when its depth is measured from its uppermost end portions to its lower most center portion to permit the hoe to be drawn into the ground more gradually than if the under edge were more sharply curved and as makes ground entry easier than if the under edge were flat, the gradual curvature of the convex undersurface serving to permit the hoe to be drawn into the surface of the ground to a limited extent as is desirable for cultivation, the undersurface of said blade having a depth from its uppermost end portions to its lowermost center portion which is over twice the length of the said undersurface.

References Cited in the file of this patent
UNITED STATES PATENTS

| | | |
|---|---|---|
| 125,438 | Carroll | Apr. 9, 1872 |
| 533,169 | Hart | Jan. 29, 1895 |
| 1,039,056 | Hess | Sept. 17, 1912 |